Dec. 29, 1959  J. W. HORNING  2,919,085
PARACHUTE
Filed Jan. 25, 1957  3 Sheets-Sheet 1
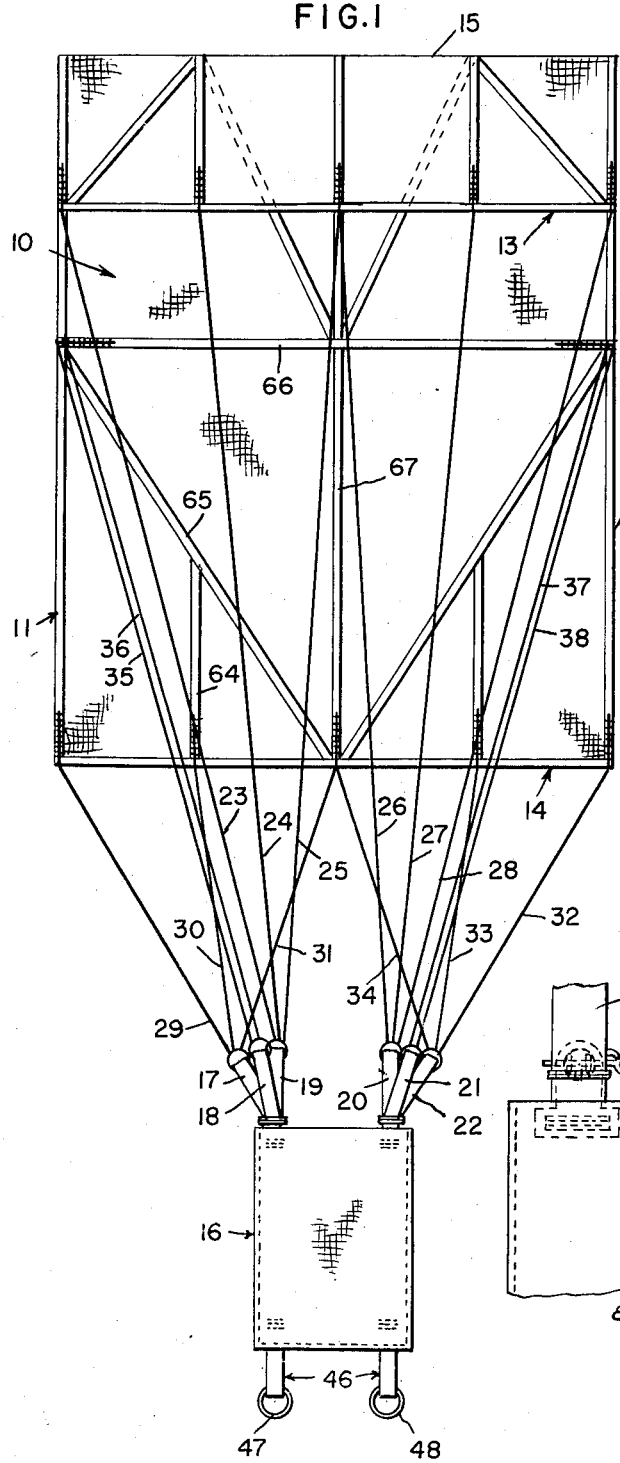
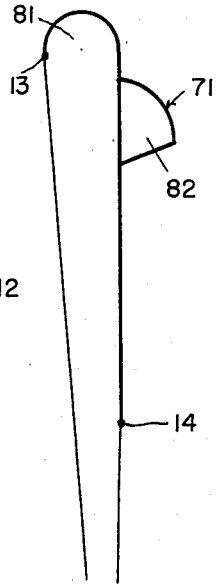
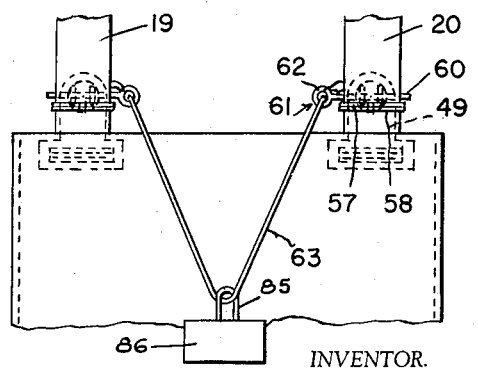
INVENTOR.
James W. Horning
BY
Shoemaker & Mattare
ATTYS Dec. 29, 1959    J. W. HORNING    2,919,085
PARACHUTE Filed Jan. 25, 1957    3 Sheets-Sheet 2

INVENTOR.
James W. Horning
BY Shoemaker & Mattare
ATTYS

Dec. 29, 1959  J. W. HORNING  2,919,085
PARACHUTE
Filed Jan. 25, 1957
3 Sheets-Sheet 3
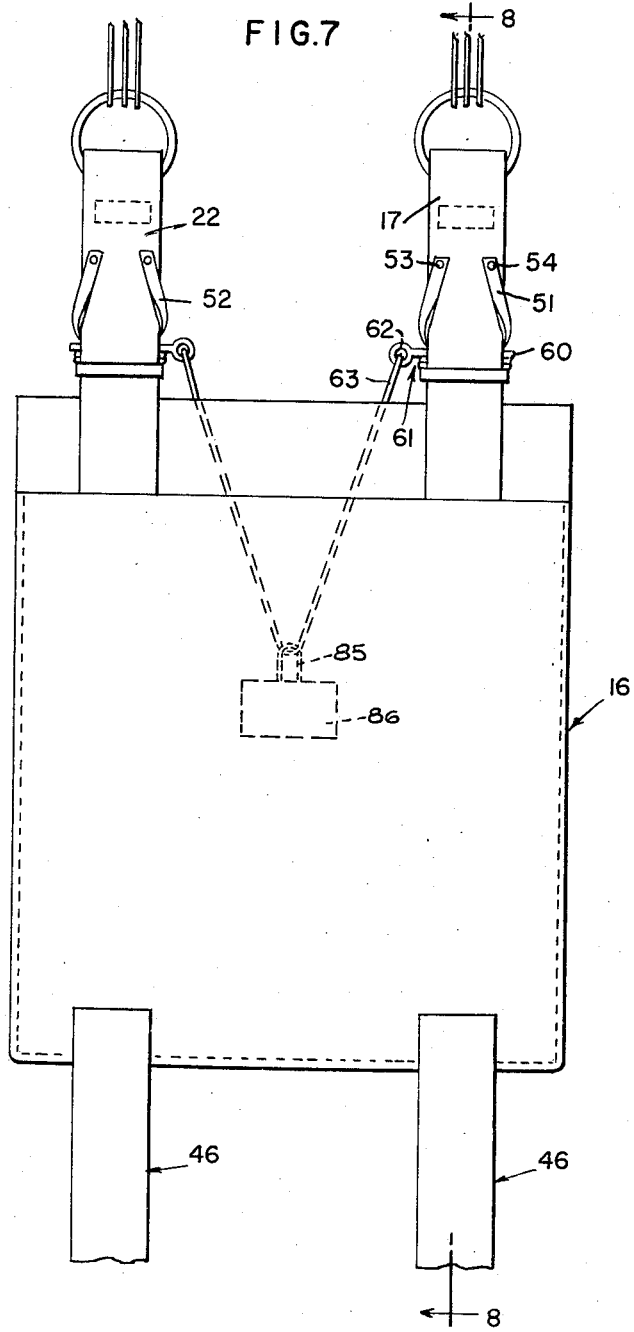
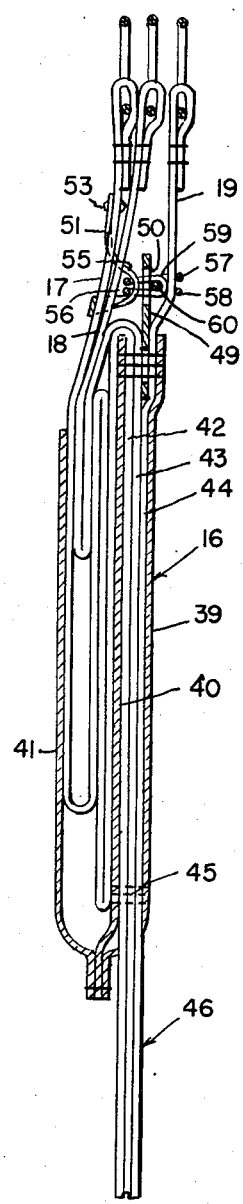
INVENTOR.
James W. Horning
BY
*Shoemaker & Mattare*
ATTYS

United States Patent Office 2,919,085
Patented Dec. 29, 1959

2,919,085

PARACHUTE

James W. Horning, Carbondale, Pa., assignor of twenty percent to Frank Talarico, twenty percent to Robert B. Jadwin, twenty percent to Alfred P. Wells, all of Carbondale, Pa., and twenty percent to Albert A. Frangell, Scranton, Pa.

Application January 25, 1957, Serial No. 636,384

7 Claims. (Cl. 244—142)

This invention relates in general to parachutes and pertains more particularly to improvements in the same particularly adapted for use as a cargo parachute.

Certain problems arise particularly in the technique of utilizing parachutes in conjunction with cargo and as relates to parachutes in general, there are certain problems which have heretofore been insurmountable. Among these difficulties is the problem of packing the parachute which, in the usual case, requires a considerable expenditure of time and the services of a rather skilled technician to insure that the parachute, when once packed, will be assured of properly opening when used. Another problem which is particularly directed to cargo parachutes is the difficulty in obtaining a good degree of accuracy in controlling the point at which the equipment or cargo will land. For this purpose, it is conventional practice to drop the cargo with the parachute attached and utilize some means for delaying the actual opening of the parachute and as a practical matter, the parachute may not be opened until it is in the neighborhood of one hundred feet from the ground. In this way, the accuracy or placement of the landing spot for the cargo can be controlled much easier than would occur if the parachute were opened as soon as the cargo was discharged from the airplane carrying the same. However, this delayed opening of the parachute introduces other problems which are of a considerable magnitude, chiefly the fact that the parachute, when opening, is very apt to become entangled with the cargo and not impart a sufficient braking force upon the freely falling cargo as to prevent damage thereto when the same lands. To overcome this, it has been proposed and indeed efforts have been made, to provide a smaller parachute which opens substantially immediately upon discharge of the cargo from the plane which serves to stabilize and guide the cargo and prevents its twisting and tumbling about which might tend to cause fouling of the shrouds and lines when the main parachute opens. However, such parachutes are extremely prone to a whipping action which, in itself, may cause a fouling of the shrouds and lines thereof with the cargo such that when the main parachute is open, the entire assemblage is fouled to such an extent as to render it practically useless.

It is, therefore, of primary consideration with connection with this invention to provide an improved form of parachute assemblage which will overcome the above disadvantages.

More specifically, it is an object of this invention to provide an improved form of parachute which incorporates an initial braking or drag effect upon the object to which it is attached so as to stabilize and guide the same during its initial fall and before the main parachute assembly comes into operation so as to assure an effective opening and operation of the main parachute portion when the same is actuated without the tendency for the shrouds and lines of the parachute to become entangled with the cargo and wherein the primary parachute portion is substantially completely devoid of any whipping action during the initial free fall of the body.

It is a further object of this invention to provide a parachute assembly embodying a pilot parachute and initially a portion of the main parachute body cooperable therewith to provide an initial guiding and slight braking force on a freely falling object with the main parachute body being so arranged, when packed, as to contain substantially all of the lines for the parachute such that separate provision for packing a large number and length of lines is not required, the lines being contained almost wholly within the main body portion of the parachute when initially packed.

Still another object of this invention lies in the provision of a generally rectangular parachute body having a plurality of lines connected to the opposite ends thereof and with the lines being connected to the parachute pack such that initially the lines connected to one end of the parachute body are shorter than the lines connected to the other end of the parachute body, whereby the parachute, when initially released, will assume a position such that only a portion of its entire area is billowed to provide the parachute effect, with provision being made for subsequent release of the initially shorter lines to assume the same length as the lines on the other end of the parachute, whereby the entire area of the parachute is billowed.

Still another object of this invention resides in the provision of a parachute constructed in accordance with the preceding object wherein there is provided an auxiliary or pilot parachute body affixed directly to the main parachute body but on the side thereof opposite to the initially billowed portion of the parachute so as to establish a balancing effect thereon during the initial position of the parachute as the same is dropping.

A further object of this invention is to provide a parachute in conformity with the foregoing object wherein the pilot parachute is positioned in staggered relation below the initially inflated or billowed portion of the main parachute body, whereby to prevent whipping of the parachute assembly as it drops in its initial position.

With the above and other objects in view, the invention consists in the construction and novel combination and arrangement of parts hereinafter fully described, illustrated in the accompanying drawings and pointed out in the claims hereto appended; it being understood that various changes in the form, proportions, and minor details of construction, within the scope of the claims, may be resorted to without departing from the spirit or sacrificing any of the advantages of the invention.

In the drawings:

Fig. 1 is a plan view of a parachute assembly constructed in accordance with this invention with the parachute body shown disposed in its initial disposition of folding and the relation of the lines thereto in such position;

Fig. 2 is an enlarged partial plan view of the parachute shrouds showing the manner in which the same are releasably interconnected and in the initial position of the parachute assembly;

Fig. 7 is an enlarged view similar to Fig. 2 but showing the opposite side of the parachute pack;

Fig. 8 is a sectional view taken through the assembly of Fig. 7 as designated by the section line 8—8 therein;

Fig. 10 is a diagrammatic view illustrating the initial position of the parachute.

Figure 3:
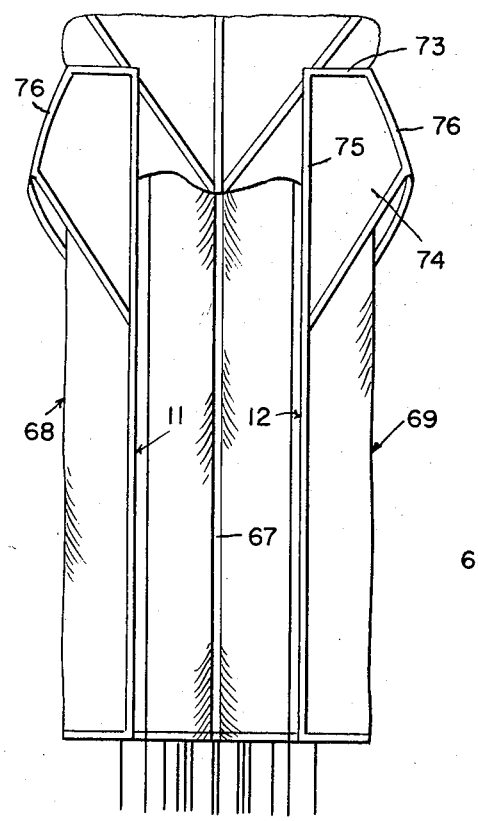
Fig. 3 is a view similar to Fig. 1 but showing the second stage position of the parachute body as the same is being folded.
Figure 4:
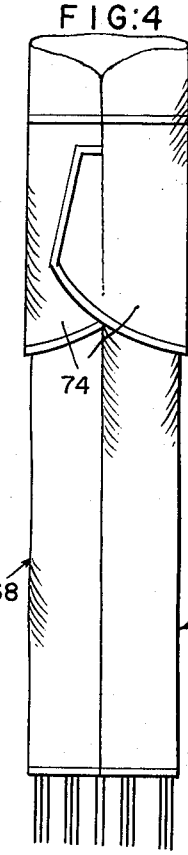
Fig. 4 is a view similar to Fig. 3 but showing the next folded disposition of the parachute body.

Referring now more particularly to Fig. 1, it will be seen that the parachute constructed in accordance with this invention preferably takes the form of a generally rectangular body 10 preferably constructed of conventional parachute material, such as silk, nylon or the like, with such body presenting opposite side edges 11 and 12 and opposite end edges 13 and 14. In the illustration of Fig. 1, the parachute body is shown in its first stage of folding wherein the upper end is folded back on itself about a fold line 15 so that a loop is provided at 15 and a double thickness of the body extends between the fold line 15 and the free end edge 13 of the parachute body.

The parachute pack is indicated generally by the reference character 16 and is provided with a plurality of shrouds or risers 17, 18, 19, 20, 21 and 22. In the particular construction shown in the drawings, the shrouds are disposed into two groups adjacent opposite side edges of the pack 16, each such group containing three shrouds. One shroud in each group, specifically shrouds 19 and 20, each has a plurality of lines 23, 24 and 25 connected thereto as, for example, those shown connected to chroud 19. These three lines 23, 24 and 25 are connected in longitudinally spaced relationship thereon with the two center lines 25 and 26 being connected immediately adjacent each other or to a common point on the edge 13.

One other shroud in each group is connected in an identical manner as described in conjunction with shrouds 19 and 20 but with lines which extend to the other end edge 14 of the parachute body. These two shrouds are shrouds 17 and 22 having the lines 29, 30, and 31 and 32, 33 and 34 respectively connected thereto as is clearly shown in Fig. 1.

The other remaining shroud in each group, namely the shrouds 18 and 21, each has a pair of lines connected thereto, lines 35 and 36 and lines 37 and 38 respectively, these lines extending from the conventional D-rings of the shrouds to the center of the opposite side edges 11 and 12 respectively of the main body portion 10 of the parachute.

It will be noted that the various lines 23–28 which are connected to the two shrouds 19 and 20 are materially longer than the corresponding lines 29–34 which are connected to the conventional D-rings of the shrouds 17 and 22. Consequently, when the shrouds are connected in the manner shown in Fig. 1 so that their D-rings are all positioned in approximately the same relationship, that is grouped together, the aforementioned fold line 15 will naturally occur by virture of the extension and tensioning of all of the various lines 29–34 and 23–28, the four lines 35–38 also being tensioned at the same time so that there is no slack in any of the lines but with the parachute folded with its upper end portion doubled over below the fold line 15 to the free end edge 13, as is clearly shown. This relationship is extremely important not only since it establishes the initial unfolded and operative position of the parachute but also since it positions the main extent of all of the longer lines within the confines of the parachute body 10 when the same is in its fully folded position as will be hereinafter described. This is in contrast to the conventional manner of packing a parachute wherein the lines are all of equal length and are all outside the confines of the parachute body. For this reason, conventional parachutes require special carrying means or fasteners to accommodate and carry the lines and prevent them from being entangled with each other and the body of the parachute when the same is in packed position, as is well known and understood in this art. With the construction shown in Fig. 1, the only portions of the lines which are exposed are those portions thereof which are between the end edge 14 of the parachute body 10 and the pack assembly 16.

In order to compensate for the unequal length between the various lines 23—28 and the lines 29—34 so as to permit the parachute to attain a fully open position, the shrouds 17 and 22 are considerably longer than the other shrouds 19 and 20 controlling the lines 23—28 attached to the other end edge 13 of the parachute. The difference in lengths between the shrouds 17 and 22 on the one hand and the shrouds 19 and 20 on the other hand is equal to the difference in lengths between the lines 23–28 and the lines 29–34 so that when the parachute is in its fully open position, as hereinafter described, the same will be normally billowed or inflated. Likewise, the shrouds 18 and 21 are somewhat longer than the shrouds 19 and 20 but not as long as the shrouds 17 and 22, since the shrouds 18 and 21 control the lines 35–38 attached to the middle portion of the parachute body and, consequently, it will not require as great a length to permit the normal fully billowed position of the parachute. However, all of the various shrouds, in the initial open position of the parachute and indeed in its packed condition, are positioned such that the conventional D-rings carried thereby are at substantially common points and for this purpose the shrouds 17, 18, 21 and 22 are shortened and held in such shortened position by the means shown more clearly in Figs. 2, 7 and 8.

In these figures, the particular construction of the pack assembly 16 is more clearly shown. The pack itself may be formed from material such as canvas and in multiple layers thereof including the front wall layer 39 and the rear wall layer 40 which are secured as by stitching around their peripheral edges and the pack also includes a pouch layer 41 secured along its opposite sides and along its bottom edge to the layers 39 and 40 as is shown more clearly in Fig. 8. The pouch layer 41 cooperates with the rear wall portion 40 to define a chamber or pouch receiving the excess lengths of the two shrouds 17 and 18 as is shown in Fig. 8 and it is to be noted that all of the shrouds in the preferred embodiment extend between the upper edges of the front and rear wall portions 39 and 40 to be secured thereto by suitable fastenings or stitching and all of the shrouds are provided with extensions such as those indicated by the reference characters 42, 43, and 44 for the particular shrouds 17, 18 and 19 respectively which extend downwardly between the front and rear walls 39 and 40 and are secured in the region 45 as by fasteners or stitching to terminate in downwardly projecting end portions 46 having conventional fastening D-rings 47 and 48 attached to their free ends, see particularly Fig. 1. This permits the entire pack assembly to be conveniently attached to cargo or the object which is desired to be dropped.

Also secured between the top edge portions of the wall portions 39 and 40 in the region of each group of shrouds is a metallic ear 49 which is securely fastened to the pack and which projects upwardly therefrom and is provided with an aperture 50 for a purpose which will be presently apparent.

Each of the shrouds 17 and 22 is provided with a flexible strap element such as is indicated by the reference characters 51 and 52 in Fig. 7, each strap being rigidly affixed at its opposite ends to the rear side of its associated shroud such as by the rivets 53 and 54 shown attaching the strap 51 to the shroud 17 in Fig. 7. These straps 51 and 52 are brought around the opposite side edges of the respective shrouds to which they are attached and on opposite sides thereof are looped as is indicated by the reference character 55 in Fig. 8 and a doubled length of flexible material or cord 56 is threaded through these loops and through the previously mentioned opening 50 in the metallic ear 49 so as to affix the straps 51 and 52 to their respective ears and thus maintain the shrouds 17 and 22 in shortened condition. Since the shrouds 17 and 22 are shortened, the intermediate shrouds 18 and 21 cannot be elongated since there will normally be no force exerted thereon which will tend to produce such results since the opposite end edges 13 and 14 of the parachute are rigidly held in the relative position shown in Fig. 1.

The previously mentioned cord 56 preferably takes the form of a length of cord having its free ends placed side by side and rigidly secured to the fixed shrouds 19 and 20, as is, for example, indicated by the reference characters 57 and 58 in Fig. 8, indicating the free ends of the flexible cord being secured to the shroud 19 by means of stitching or the like. The doubled cord then passes over one edge of the shroud 19, through the opening 50 in the metallic ear and through the loops 55 formed by the associated strap 51 and then back through the opening 50 to terminate in the loop or eye 59 lying between the ear 49 and the shroud 19, as is shown most clearly in Fig. 8. The cord is normally held in such position by means of the shank 60 of a retaining pin 61, see particularly Figs. 2 and 7. Each of such pins is provided with an eye portion 62 and connected between the eyes of the two pins is a length of cord 63 with sufficient slack therein so as to be attached to a conventional timing release mechanism. Cord 63 is connected to the timing release mechanism indicated by reference numeral 66 by means of a loop of cord 85 passing around cord 63 and having its opposite end portions attached to the timing release mechanism. In this respect, any conventional and well known type of timing release mechanism may be employed as shown for example in U.S. Patent No. 2,584,164, the purpose of which is to delay the final opening of the parachute until a predetermined time, when the timing release mechanism will jerk on the cord 63 and pull the pins 61 from the associated loops 59 of the flexible cord elements 56 and thus release the straps 51 and 52 to permit the normal air drag on the parachute to extend the shrouds 17, 18, 21 and 22 to their full lengths and permit the parachute to assume a fully inflated or billowed condition.

Referring once again to Fig. 1, there is a certain arrangement of reinforcing strips for the main body portion 10 of the parachute which is preferred. This arrangement includes peripheral reinforcing strips along the opposite side edges 11 and 12 of the main body portion as well as along the opposite end edges 13 and 14 and additional longitudinally directed reinforcing strips extending between opposite points of line attachment on thte end edges 13 and 14. For example, the main body portion is provided with a reinforcing strip 64 extending from the end edge 14 at the point of attachment thereto of the line 30, which reinforcing strip extends longitudinally of the main body 10 toward the point of attachment of the line 24 to the opposite end edge 13. However, the reinforcing strip 64 terminates at a diagonal reinforcing strip member 65 which extends from the center of the end edge 14 to the center of the side edge 11, as is shown. The centers of the two side edges are, in turn, connected by a reinforcing strip 66 and serve to interconnect the points of connection of the lines 35 and 36, and the lines 37 and 38. A centrally located longitudinally extending reinforcing strip 67 extends completely between the opposite end edges 13 and 14 and is the only longitudinal reinforcing strip, other than the side edge reinforcing strips which extend through the complete length of the parachute body. The diagonal reinforcing strips and shorter lengths such as the strip 64 are identically repeated in the other end of the parachute body, as will be clearly seen.

Figure 5:
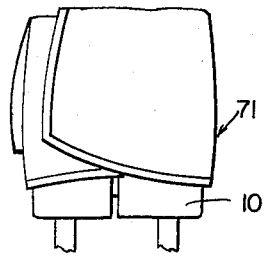
Fig. 5 is a view showing the parachute and pack assembly in fully folded position.
Figure 6:
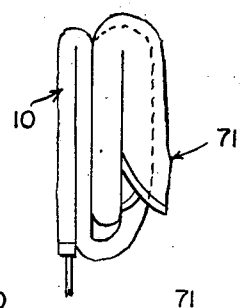
Fig. 6 is a side elevational view of the parachute and pack assembly completely folded as illustrated in Fig. 5.

An important aspect of the invention resides in the relationship of the shrouds, lines and parachute body when the same is folded or packed and to illustrate this, reference is had most particularly to Figs. 1, 3, 4, 5 and 6 wherein various stages of packing are shown. Fig. 1 illustrates the initial folded packed position of the parachute body and the lines as well as the shrouds. In this figure, the body of the parachute is spread out evenly, preferably on a suitable table for this purpose with the shrouds 17, 18, 21 and 22 disposed and secured in the shortened position and with all of the various lines attached thereto fully extended and lightly tensioned so that the upper end of the parachute is doubled back or folded upon itself as is shown. This positions the major portion of all of the lines 23–28 as well as the lines 35–38 within the confines of the parachute body 10. The opposite edges of the parachute are then folded toward the center thereof into the position shown most clearly in Fig. 3 but with the opposite side edges 11 and 12 disposed in spaced relationship from each other and on opposite sides of the reinforcing strip 67 which defines the longitudinal center lines of the parachute body 10. This position exposes the fold lines 68 and 69 on opposite side edges of the thus folded parachute body. These fold lines 68 and 69 are then brought into the longitudinal center of the parachute body as is shown in the semi-packed position of Fig. 4 so that the width of the parachute body is materially narrowed. The final or fully packed position of the parachute is illustrated in Figs. 5 and 6 wherein the parachute body is folded from the position of Fig. 4 about lines of fold which extend transversely thereof so as to provide a plurality of superimposed folded portions as illustrated in these two latter figures. Actually, deviations may be made in the particular packing method but there is a predetermined relationship, presently described, which must exist in order for the parachute to properly operate.

Figures 9, 11:
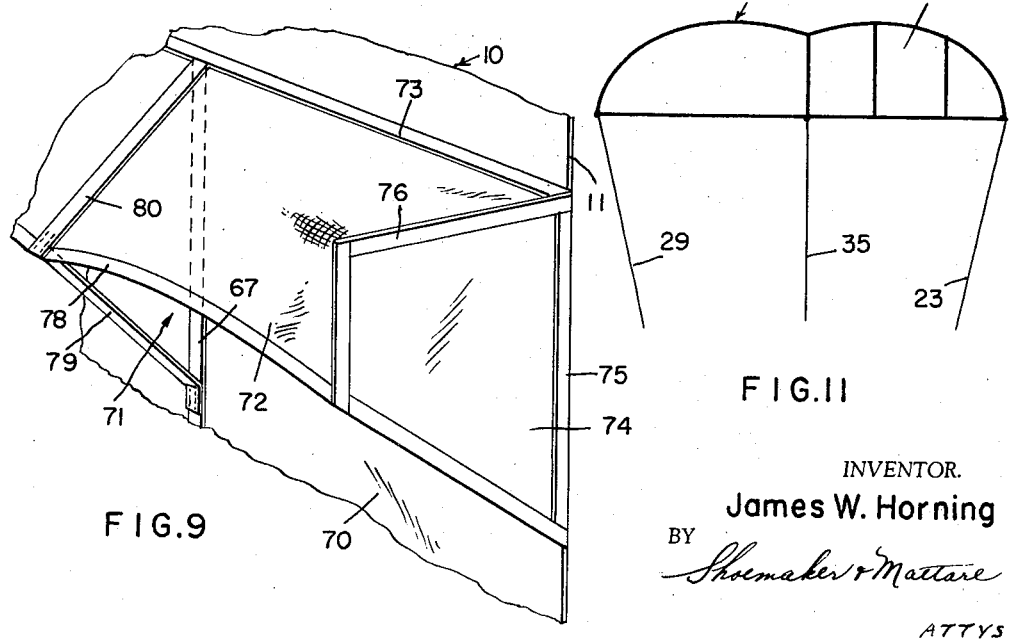
Fig. 9 is a partial perspective of the parachute assembly in its initial opened position and showing the pilot parachute in operative relationship.
Fig. 11 is a diagrammatic view similar to Fig. 10 but showing the final stage or fully open position of the parachute.

The outer face of the parachute body 10 is provided with a pilot parachute appendage as is illustrated most clearly in Fig. 9. In this figure, the outer face of the parachute body 10 or that which might be termed the rear face thereof in Fig. 1 is illustrated by the reference character 70, whereas the pilot parachute is designated generally by the reference character 71. The pilot parachute proper consists of a length of material 72 extending completely across and between the opposite side edges 11 and 12 of the main body portion 10 and secured thereto as by means of a rigidifying strip or tape 73. Vertical end panels 74 are provided at the opposite sides of the portion 72 which have their vertical edges secured to the main body 10 by means of the reinforcing tape 75 and which are rigidly affixed and reinforcingly taped to the pilot parachute strip 72 by means of the tape 76, as is clearly shown in Fig. 9. This permits the pilot parachute to billow away from the outer face 70 of the main body portion of the parachute, such position being shown in Fig. 9 with the free edge of the strip 72 having a reinforcing strip or tape 78 affixed therealong. To control the fully billowed position of the pilot parachute, a strut of flexible tape 79 may be provided extending between the reinforcing tape 67 and the center of the transverse free edge of the pilot parachute strip 72 and to further rigidify the assembly, an additional tape 80 may be provided on the pilot parachute strip 72 which extends from the point of connection of the strut 79 to the central portion of the transverse reinforcing and securing strip 73, as is shown.

Thus, the pilot parachute, when open, forms a pocket for trapping air and imparting a braking force to the cargo to which the parachute is attached. The pilot parachute also serves to open the entire parachute assembly when the same is initially dropped from the airplane and for this purpose, it is important that a part of the pocket provided by the pilot parachute assembly be exposed on one side of the parachute pack when the same is fully folded and for this reason, as will be seen in Figs. 5 and 6, that portion of the main body 10 of the parachute which carries the pilot parachute must always be so folded as to be exposed at one side or the other of the packed assembly. This condition must be followed if the parachute is to successfully open.

Fig. 10 illustrates the initial open position wherein the longer shrouds are retained in their shortened position and in this figure it is clearly illustrated that two air pockets are formed by the particular parachute construction employed herein. The uppermost pocket 81 is formed by virtue of the relationship in lengths between the shrouds and lines connected to the opposite end edges 13 and 14 of the main body of the parachute and which cause the same to assume a generally inverted J-shaped position as is shown. Fig. 10 also serves to clearly illustrate that the pilot parachute assembly 71, which forms the other air pocket 82 on the opposite side of the parachute is positioned below the main body portion of the parachute which forms the pocket 81 and in this respect, the free edge 78 of the pilot parachute strip 72 is approximately positioned at the transverse medial line of the main body portion 10 and with the attached edge of the strip 72 being secured transversely across the parachute body 10 in the region thereof adjacent the line defined by the upper end edge 13 when the same is doubled or folded back upon the parachute body as illustrated in Fig. 1. The purpose of this construction serves several useful functions. One of these functions is, of course, to permit the pilot parachute to readily trail the parachute body out from the pack when initially dropped. Another function to to provide a balanced relationship between the two pockets 81 and 82 such as to inhibit or prevent whipping of the parachute body during its descent in the initial position of Fig. 10. Furthermore, this location of the pilot parachute 71 also serves to roll the main body portion of the parachute into the final disposition thereof as is illustrated in Fig. 11 when the pins 61 are pulled to release the shrouds 17, 18, 21 and 22 to permit the same to elongate to their full lengths. This final disposition of the shrouds 17, 18, 21 and 22 is achieved, under control of suitable mechanism such as the time release mechanism previously mentioned, so as to occur at a height relatively close to the ground surface so that the final braking action imparted to the cargo by the full parachute assembly is only accomplished near the end of the descent of the cargo. This permits the cargo to be dropped with great accuracy since if the parachute is fully opened at a great height, the effect of wind currents and the like thereon can cause the cargo to drift far off the target area. Therefore, the parachute construction provides an initial position on the parachute which at once serves to impart an initial braking action in the descent of the cargo and also prepares the parachute for the subsequent or final opening position wherein the full braking force is effected.

I claim:

1. A parachute of the type having an initial and a final open position, comprising a main parachute body sheet having opposed end portions, a first plurality of flexible lines fixed at spaced points along one of said edge portions, a second plurality of flexible lines fixed at spaced points along an opposite edge portion, a first plurality of risers connected at one end thereof to said first plurality of flexible lines and having their opposite ends connected to a pack assembly, a second plurality of risers connected at one end thereof to said second plurality of flexible lines and having the opposite ends thereof connected to a pack assembly, said first plurality of risers being substantially longer than said second plurality of risers and said first plurality of lines being substantially shorter than said second plurality of lines, the combined lengths of the lines and associated risers connected thereto being the same in all cases, means connected to said first risers and for shortening the overall length of said first risers and associated first lines such that the over-all lengths of said second plurality of risers and said second lines is greater than the over-all length of said first risers and said first lines by a distance less than the length of said parachute body between said opposite end edge portions whereby when all the lines and risers are tensioned, the parachute body will have a marginal portion adjacent said other edge portion thereof doubled back upon itself to provide an air pocket, and means connected to said shortening means for releasing said shortening means whereby the main parachute body will assume a substantially horizontal billowed position.

2. A parachute comprising a substantially rectangular main body portion having opposite end edge portions disposed in generally parallel relationship, a first plurality of flexible lines connected to one of said edge portions, a second plurality of flexible lines connected to another of said edge portions, said first plurality of lines being substantially shorter than said second plurality of lines, a first plurality of risers attached to said first plurality of lines, a second plurality of risers connected to said second plurality of lines, all of said risers being connected to a pack assembly, said first plurality of risers being substantially longer than said second plurality of risers, the combined lengths of the lines and associated risers connected thereto being the same in all cases, means connected to said first risers for shortening the over-all length of said first risers and associated first lines such that the over-all lengths of said second plurality of risers and said second lines is greater than the over-all length of said first risers and said first lines by a distance less than the length of said parachute body between said opposite end edge portions whereby the parachute assembly will assume an initial open position with the greater extent of said main body portion disposed vertically and the marginal portion adjacent said other edge portion being doubled back upon itself to provide an air pocket, and means connected to said shortening means for releasing said shortening means whereby the parachute will assume a final open position wherein the main body portion thereof is disposed substantially horizontally.

3. Apparatus as defined in claim 1 wherein a pilot parachute pocket is provided on said main body portion of the parachute so as to be disposed below and on the opposite side as said doubled back marginal edge portion of the main body portion.

4. Apparatus as defined in claim 2 wherein a pilot parachute pocket is provided on said main body portion of the parachute so as to be disposed below and on the opposite side as said doubled back marginal edge portion of the main body portion.

5. A parachute assembly comprising a fabric-like main body portion having end opposed edge portions, a first plurality of flexible lines fixed at spaced points along one of said edge portions, a second plurality of flexible lines fixed at spaced points along another of said edge portions, a first plurality of risers connected to said first plurality of lines, a second plurality of risers connected to said second plurality of lines, a pack assembly to which all of said risers are anchored, means connected to said first plurality of risers for releasably fixing said first plurality of risers in shortened condition whereby when all of said lines are tensioned, the marginal portion of said other edge of the main body portion of the parachute is doubled back upon itself to provide an air pocket, means connected to said shortening means for selectively releasing said shortened risers, said main body portion having a pilot parachute pocket extending transversely thereof and being disposed below and on the opposite side as said doubled back marginal edge portion of the main body.

6. Apparatus as defined in claim 1 including a pilot parachute strip fixed to said main body portion on the opposite side of the body portion as said air pocket and extending between the opposite side edges of said body portion along a line spaced between the transverse center of said body portion and said other end portion thereof with the free edge of said pilot strip extending in the direction toward said one edge portion of the body portion to provide an auxiliary air pocket on said parachute body.

7. A parachute of the type having an initial and a final open position, comprising a main parachute body substantially rectangular in configuration and including side edges and end edges, a first plurality of flexible lines connected at spaced points along one of said end portions, a second plurality of flexible lines connected at spaced points along the opposite end edge, a third plurality of flexible lines connected to said side edges, a first plurality of risers connected to said first plurality of lines, a second plurality of risers connected to said second plurality of lines, a third plurality of risers connected to said third plurality of lines, all of said risers being connected to a pack assembly, said second plurality of lines being longer than said third plurality of lines, said third plurality of lines being longer than said first plurality of lines, said first plurality of risers being longer than said third plurality of risers and said third plurality of risers being longer than said second plurality of risers, the combined lengths of the lines and associated risers connected thereto being the same in all cases, means connected to said first risers for shortening the over-all length of said first risers and associated first lines such that the over-all lengths of said second plurality of risers and said second lines is greater than the over-all length of said first risers and said first lines by a distance less than the length of said parachute body between said opposite end edge portions whereby when all the lines and risers are tensioned, the parachute body will have a marginal portion adjacent said other edge portion thereof doubled back upon itself to provide an air pocket, and means connected to said shortening means for releasing said shortening means whereby the main parachute body will assume a substantially horizontal billowed position.

References Cited in the file of this patent

UNITED STATES PATENTS

| | | |
|---|---|---|
| 2,053,342 | Knight | Sept. 8, 1936 |
| 2,458,264 | Hart | Jan. 4, 1949 |
| 2,517,488 | Horning | Aug. 1, 1950 |
| 2,553,909 | Frieder et al. | May 22, 1951 |

FOREIGN PATENTS

| | | |
|---|---|---|
| 226,851 | Great Britain | Dec. 30, 1924 |
| 597,235 | France | Aug. 25, 1925 |